(No Model.)
P. DEVENING.
GRAIN DRILL GAGE.
No. 265,033. Patented Sept. 26, 1882.
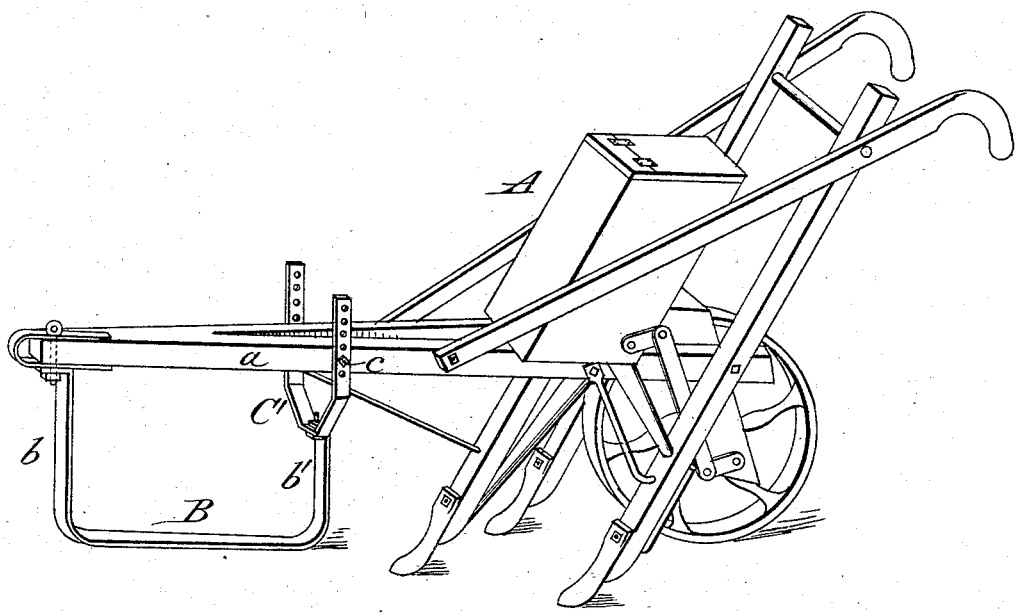
Attest:
F. H. Schott
Jno. A. Hockman
Inventor:
Philip Devening
pr J. C. Tasker atty

United States Patent Office.

PHILIP DEVENING, OF RAY'S CROSSING, INDIANA.

GRAIN-DRILL GAGE.

SPECIFICATION forming part of Letters Patent No. 265,033, dated September 26, 1882.

Application filed October 17, 1881. (No model.)

*To all whom it may concern:*

Be it known that I, PHILIP DEVENING, of Ray's Crossing, in the county of Shelby and State of Indiana, have invented a new and useful Improvement in Grain-Drill Gages, of which the following is a specification, reference being had to the accompanying drawing and the letters of reference marked thereon.

This invention relates to certain new and useful improvements in that class of grain-drills in which the driving-wheel is placed at the rear end of the frame and behind the plows or drill-teeth, and has for its object the adjusting of the depth to which the plows or teeth penetrate the earth, and thereby insure the planting of the grain at a uniform depth.

It consists more particularly in the construction and arrangement of parts, as will be hereinafter more fully described and claimed.

The annexed drawing, which fully illustrates the invention, represents a perspective view of a grain-drill with my device attached thereto.

A represents a grain-drill having a forked draft-beam, *a*, to the forward end of which, on its under side, the forward end of a gage, B, is attached. This gage B is preferably bent into an irregular U-shaped form, as shown in the drawing, and has its lower corners rounded to permit its passing easily over the ground. The arms or uprights *b b'* of the U-shaped gage are of unequal length, the forward arm, *b*, being longer than the rear arm, *b'*. The upper end of the rear upright or arm, *b'*, is bent at a right angle to its main portion, and forms a seat to which a forked extension, C, is securely attached. The arms or forks of the extension C, which are provided with perforations, extend in an upward direction, and are adapted to embrace the sides of the beam *a* of the drill A. The beam *a* is also provided with a perforation to correspond with the perforations in the arms or forks of the extension C. Through these perforations in the arms or forks of the extension C and the beam *a* of the drill a pin or bolt, *c*, is passed, and by these means the extension C of the gage B can be adjusted vertically upon the beam *a* of the drill A. By this adjustment the plows or drill-teeth can be inserted into or withdrawn from the earth to any desired degree.

It is obvious that the forked extension C, instead of being made separate from the gage B, may be made in one piece therewith.

By the construction and arrangement of parts as hereinbefore described and shown I obtain a gage which may be manufactured at a very slight cost, is simple in construction and attachment, and is also of sufficient strength to serve as a support for the forward part of the drill when passing obstructions in the field.

I am aware that adjustable gages and runners of various forms have heretofore been used in connection with grain-drills and cultivators, and I therefore do not claim such, broadly; but,

Having thus described my invention, what I claim as new, and desire to secure by Letters Patent, is—

In a grain-drill, the combination, with the forked beam *a*, of the gage B, having arms *b b'*, forked extension C, having perforated arms, and the bolt or pin *c*, substantially as shown and described.

In testimony whereof I have hereunto signed my name.

PHILIP DEVENING.

Witnesses:
HENRY DOBLE,
EDWIN P. FERRIS.